United States Patent
Onishi

(10) Patent No.: US 7,898,685 B2
(45) Date of Patent: Mar. 1, 2011

(54) IMAGE GENERATING/READING APPARATUS AND METHODS AND STORAGE MEDIA STORING PROGRAMS THEREFOR

(75) Inventor: Takeshi Onishi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 829 days.

(21) Appl. No.: 11/262,784

(22) Filed: Nov. 1, 2005

(65) Prior Publication Data
US 2006/0203314 A1 Sep. 14, 2006

(30) Foreign Application Priority Data
Mar. 14, 2005 (JP) ............................. 2005-070916

(51) Int. Cl.
*G06K 15/00* (2006.01)

(52) U.S. Cl. .................. 358/1.18; 358/403; 358/449; 358/453; 345/156; 345/179; 345/180; 345/181; 382/209; 382/236; 382/239; 382/248; 382/306; 715/221; 715/244; 715/255; 715/764; 715/765

(58) Field of Classification Search ............... 358/1.18, 358/403, 449, 453, 540; 235/454, 462.01, 235/462.04, 468, 472.01, 487, 494; 345/156, 345/179, 180, 181; 382/306, 209, 236, 239, 382/248; 715/221, 244, 255, 764, 765
See application file for complete search history.

(56) References Cited

U.S. PATENT DOCUMENTS

| | | | | |
|---|---|---|---|---|
| 5,600,350 | A * | 2/1997 | Cobbs et al. ................... | 347/19 |
| 6,188,404 | B1 * | 2/2001 | Rekimoto ..................... | 715/764 |
| 6,310,988 | B1 * | 10/2001 | Flores et al. ................. | 382/313 |
| 6,327,395 | B1 * | 12/2001 | Hecht et al. .................. | 382/306 |
| 6,330,976 | B1 * | 12/2001 | Dymetman et al. .......... | 235/487 |
| 6,651,894 | B2 * | 11/2003 | Nimura et al. ............... | 235/494 |
| 6,752,317 | B2 * | 6/2004 | Dymetman et al. ..... | 235/462.45 |
| 6,828,959 | B2 * | 12/2004 | Takekawa et al. ........... | 345/173 |
| 7,094,508 | B2 * | 8/2006 | Takagi et al. ................ | 430/45.5 |
| 7,100,110 | B2 * | 8/2006 | Shiraishi et al. ............. | 715/255 |
| 7,175,095 | B2 * | 2/2007 | Pettersson et al. ........... | 235/494 |
| 7,176,896 | B1 * | 2/2007 | Fahraeus et al. ............. | 345/173 |
| 7,196,825 | B2 * | 3/2007 | Rydbeck et al. ............. | 358/424 |
| 7,202,963 | B2 * | 4/2007 | Wiebe et al. ................ | 358/1.15 |
| 7,404,144 | B2 * | 7/2008 | Silverbrook et al. ........ | 715/700 |

(Continued)

FOREIGN PATENT DOCUMENTS

JP A-10-187911 7/1998

(Continued)

OTHER PUBLICATIONS

English Translation of Japanese Office Action, dated Aug. 18, 2009.

*Primary Examiner*—Mark K Zimmerman
*Assistant Examiner*—Dung D Tran
(74) *Attorney, Agent, or Firm*—Oliff & Berridge, PLC

(57) ABSTRACT

This invention provides an image generating apparatus including a composite image generating unit that generates a composite image in which an image of an object to be printed onto a medium is combined with an image for coordinate address information for locating a position on the medium and an image for address identification information for identifying the coordinate address information.

20 Claims, 10 Drawing Sheets

U.S. PATENT DOCUMENTS

| | | | |
|---|---|---|---|
| 7,489,415 B2 * | 2/2009 | Furuta et al. | 358/1.15 |
| 7,694,875 B2 * | 4/2010 | Mitamura | 235/375 |
| 7,830,555 B2 * | 11/2010 | Katsurabayashi | 358/3.28 |
| 2002/0065853 A1 * | 5/2002 | Takahashi et al. | 707/527 |
| 2003/0046256 A1 * | 3/2003 | Hugosson et al. | 707/1 |
| 2004/0035935 A1 * | 2/2004 | Takahashi et al. | 235/462.09 |
| 2005/0145703 A1 * | 7/2005 | Bryborn | 235/494 |
| 2006/0221383 A1 * | 10/2006 | Katsurabayashi | 358/1.15 |
| 2006/0268288 A1 * | 11/2006 | Tanaka | 358/1.1 |

FOREIGN PATENT DOCUMENTS

| | | |
|---|---|---|
| JP | A-2000-099257 | 4/2000 |
| JP | A-2000-293303 | 10/2000 |
| JP | A-2001-051792 | 2/2001 |
| JP | A-2001-127944 | 5/2001 |
| JP | A-2002-240387 | 8/2002 |
| JP | A-2003-508843 | 3/2003 |
| WO | WO 01/16691 A1 | 3/2001 |

* cited by examiner

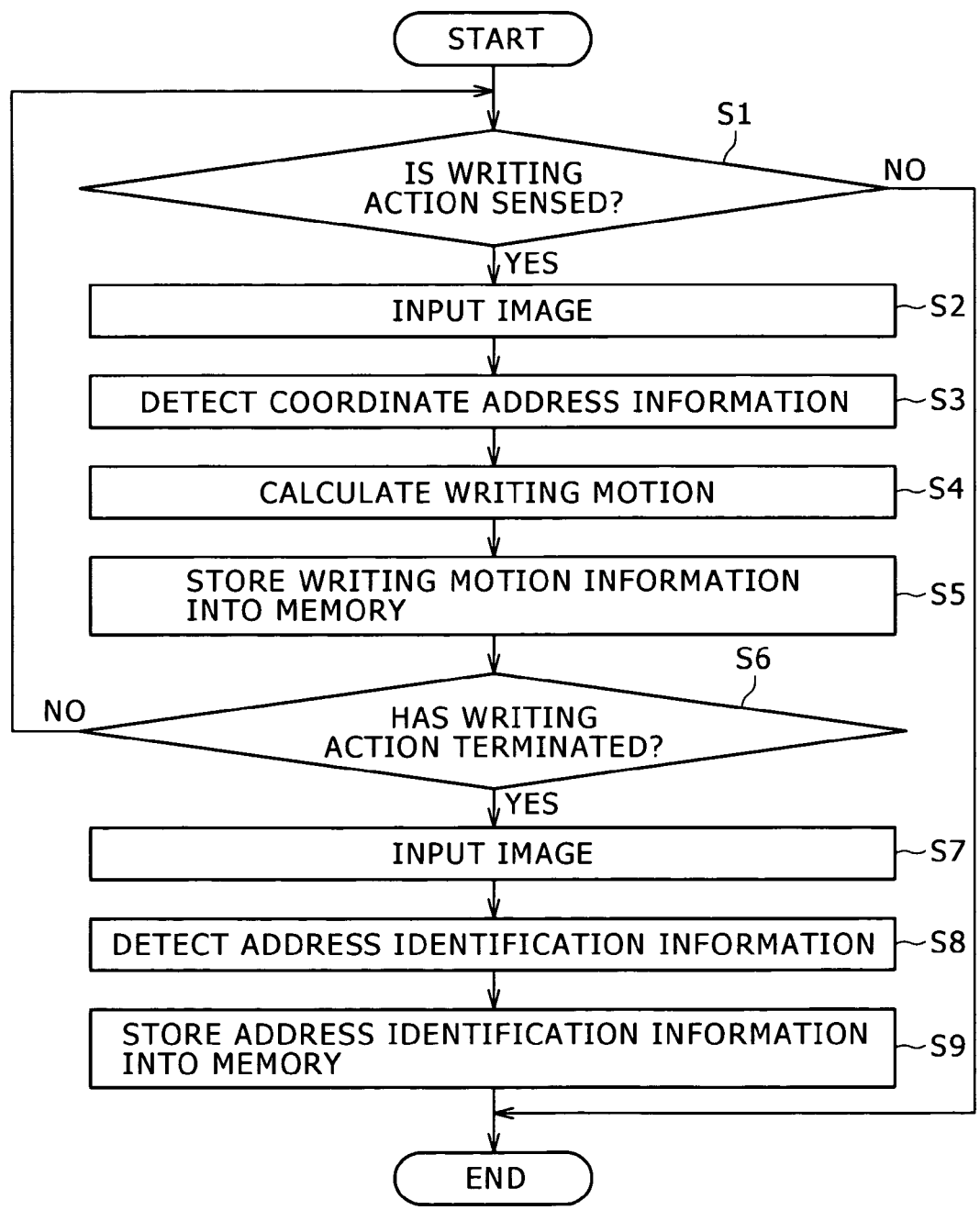

FIG. 6

| A1 | A2 | A3 | A4 | A5 | A6 | A7 | A8 | A9 | A10 | A11 | A12 | A13 | A14 | A15 |
| B1 | B2 | B3 | B4 | B5 | B6 | B7 | B8 | B9 | B10 | B11 | B12 | B13 | B14 | B15 |
| C1 | C2 | C3 | C4 | C5 | C6 | C7 | C8 | C9 | C10 | C11 | C12 | C13 | C14 | C15 |
| D1 | D2 | D3 | D4 | D5 | D6 | D7 | D8 | D9 | D10 | D11 | D12 | D13 | D14 | D15 |
| E1 | E2 | E3 | E4 | E5 | E6 | E7 | E8 | E9 | E10 | E11 | E12 | E13 | E14 | E15 |
| F1 | F2 | F3 | F4 | F5 | F6 | F7 | F8 | F9 | F10 | F11 | F12 | F13 | F14 | F15 |

IMAGE GENERATING/READING APPARATUS AND METHODS AND STORAGE MEDIA STORING PROGRAMS THEREFOR

BACKGROUND

1. Technical Field

The present invention relates to image processing apparatus or methods, such as an image generating apparatus to generate an image and an image reading apparatus to read such an image. In particular, the present invention relates to a technique for generating coordinate-addressed, tagged images, in which the position within an image can be obtained by reading machine-readable codes embedded in the background or the like of the image, and a technique for reading such coordinate-addressed, tagged images.

2. Related Art

A new user interface technique has been proposed in which, for example, coordinate address information is embedded beforehand in a paper page so that the position of a point on the page can be identified, which enables access to electronic information associated with a coordinate address on the page by reading the coordinate address information.

However, when location information on paper pages is represented by a two-dimensional code, the use of a larger two-dimensional code increases the location information that can be represented, whereas the distance between the intervals at which location can be represented increases. Consequently, the image capturing area of a scanner such as a charge-coupled device (CCD) installed on a pen has to be made larger or a higher density image capturing element with a brighter optical device for delivering a higher resolution has to be used. This has posed the following problems: the pen size has to be made greater, the optical device of the pen is costly, and the system cost increases. Conversely, when a smaller two-dimensional code is used, these problems do not occur. However, the amount of information that can be embedded in a two-dimensional code decreases. Thus, the coordinate address information (address space) that can be represented decreases, the number of sheets in which coordinates can be addressed and issued decreases, and eventually address depletion will take place. To avoid this, if duplicated coordinate addresses are used, it becomes difficult to trace information on a paper page scanned by the pen, for example, by locating the information in what page of what document.

SUMMARY

This invention provides an image generating apparatus including a composite image generating unit that generates a composite image in which an image of an object to be printed onto a medium is combined with an image for coordinate address information for locating a position on the medium and an image for address identification information for identifying the coordinate address information.

BRIEF DESCRIPTION OF THE DRAWINGS

The above and other aspects, features, and advantages of the present invention will be more apparent from the following description of an illustrative embodiment thereof, taken in conjunction with the accompanying drawings, wherein:

FIG. 3 illustrates an example of a writing motion tracing procedure;

FIG. 6 illustrates an example of coordinate address information represented by a two-dimensional code embedded in a medium;

DETAILED DESCRIPTION

An embodiment of the present invention is now described with reference to the drawings.

First, this embodiment is outlined.

In this embodiment, addressing information is divided into two, one (which is referred to as coordinate address information in this embodiment) that is printed on a paper sheet in an area where coordinate addresses need to be detected and the other (which is referred to as address identification information) that is printed in a space where coordinate addresses need not to be detected, for example, a page margin. Thereby, addresses are assigned to coordinates on a sheet effectively. In this embodiment, by scanning the space where address identification information is printed after or before writing takes place within an area where coordinate address information is printed, positional information that is clearly determined from the coordinate address information and the address identification information is calculated and writing information on a particular paper sheet can be detected.

Even if paper pages have the same coordinate address information, the positional information on each sheet can be identified by making a difference in address identification information.

The address identification information may be configured arbitrarily, provided that it does not include duplication within the scope of application of the present embodiment. Thus, a diversity of addresses such as an IP (Internet Protocol) address of a client or a server that issues addresses and an IP address of an image forming device that prints on paper can be used.

A concrete embodiment of the present invention will be described below.

Figure 1:
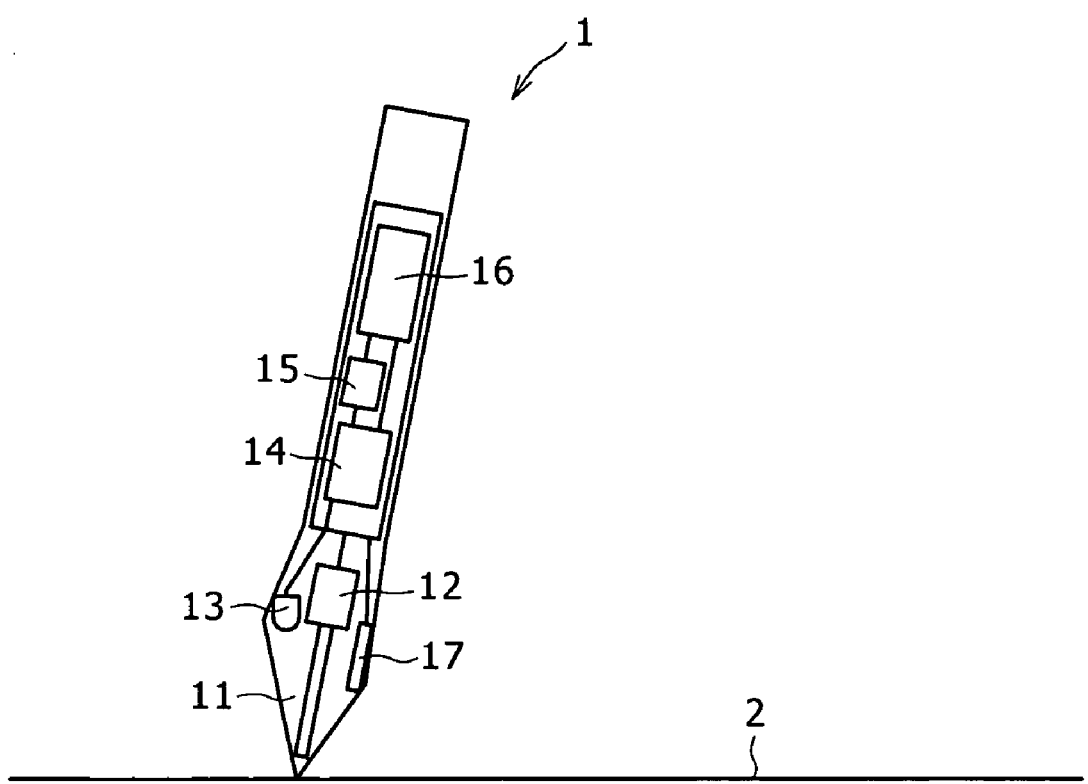
FIG. 1 illustrates an example of a construction of a pen-type scanner involved in an embodiment of the present invention.

FIG. 1 illustrates an example of a construction of a pen-type scanner 1 and a medium 2 which is paper.

The pen-type scanner 1 of this example is equipped with a writing point 11 for writing on the medium (paper) a writing pressure detecting part 12 to sense a writing action made by the writing point 11 and determine, for example, whether or not writing is performed, an image input part 13 which captures an image in the vicinity of the writing point on the paper and which is, for example, a two-dimensional image capturing element such as CCD by which a image for a two-dimensional code on the paper is captured, a code information obtaining part 14 which decodes the two-dimensional code image, input from the image input part 13, and obtains coordinate address information on the paper and address identification information, a writing motion calculating part 15 which calculates a writing motion of the writing point 11 from the coordinate address information obtained from the code information obtaining part 14, and an information memory 16 which is a memory or the like to store and retain the calculated writing motion and the address identification information, and a communication interface part 17 which sends the stored writing motion information and others to a terminal device such as an external personal computer (PC).

Here, code reading can be performed in such a manner that a light emitting part is provided at the tip of the pen-type scanner and code is read in reference to a reflection of light emitted from the light emitting part from the paper surface or may be performed by a reflection of natural light from the paper surface. Code reading can be performed by, for example, detecting an optical absorption point or detecting an optical point.

Sensing of whether or not writing is made by the writing point 11 is not only performed by the writing pressure sensing method but also may be done by other methods; for example, a method of detecting a change in electrical conductivity when the pen point touches paper.

As the communication interface part 17, for example, a wired cable such as USB or a wireless interface such as Bluetooth may be used.

Figure 2:
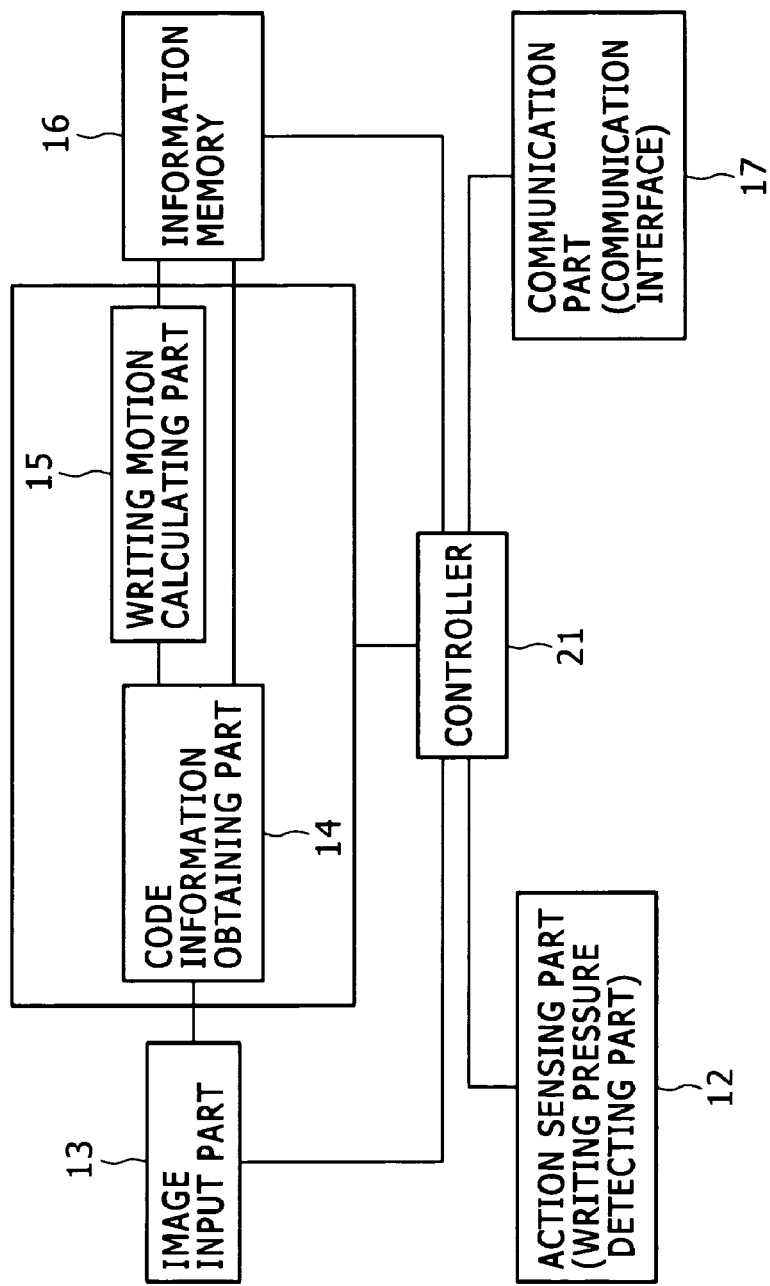
FIG. 2 illustrates an example of a configuration of a writing motion tracing device.

FIG. 2 illustrates a functional block diagram illustrating an example of a configuration of a device that traces the writing motion of the writing point 11 (a writing motion tracing device). In the present embodiment, the pen-type scanner 1 illustrated in FIG. 1 is used as such a writing motion tracing device.

As illustrated in FIG. 2, the writing motion tracing device of this example includes an action sensing part (writing pressure detecting part in this embodiment) 12, an image input part 13, a code information obtaining part 14, a writing motion calculating part 15, an information memory 16, an communication part (a communication interface part in this embodiment) 17, and a controller 21. In this example, the code information obtaining part 14 and the writing motion calculating part 15 constitute an image processing part.

The controller 21 is omitted from the drawing of the pen-type scanner 1 illustrated in FIG. 1.

FIG. 3 illustrates an example of a writing motion tracing procedure that is carried out by the pen-type scanner 1 according to the present embodiment.

Using the pen-type scanner 1, a user performs a writing action on the paper in the area where coordinate address information has been embedded.

First, the writing pressure detecting part 12 senses whether a writing action is made by the writing point 11 (step S1). If the writing action is made, the image input part 13 inputs an image, that is, an image for a two-dimensional code representing embedded coordinate address information (step S2). The code information obtaining part 14 detects and decodes the two-dimensional code from the input image and detects the coordinate address information on the paper (step S3). From the detected coordinate address information, the writing motion calculating part 15 generates the writing motion and stores the writing motion information into the information memory 16 (step S5).

If the writing action has terminated in the area where coordinate address information has been embedded (step S6), then the user holding the pen-type scanner 1 scans a space where address identification information has been embedded. The image input part 13 inputs an image for a two-dimensional code representing embedded address identification information (step S7). The code information obtaining part 14 decodes the two-dimensional code and detects address identification information (step S8). The detected address identification information is stored into the information memory 16 (step S9) and the procedure terminates.

Here, when the space where address identification information has been embedded is scanned, for example, a writing action may be performed at the same time or an image input action may be performed, whereas a writing action is not performed. As a method for enabling only inputting an image for address identification information, such a method can be used that a button activating a scan of address identification information is provided on the pen-type scanner 1.

While this example of the procedure has been configured such that writing motion information generated from coordinate address information and address identification information are separately stored into the memory, it is also possible, for example, to configure the writing motion information as the one in which coordinate address information and address identification information are combined. While address identification information is scanned finally after a writing action is performed in this example of the procedure, it is also possible to apply a process in which address identification information is first scanned before a writing action is performed.

For example, in an instance where, in one domain of address identification information A, a writing motion made up of m pieces of coordinate addresses and a writing motion made up of n pieces of coordinate address information are detected, and, in another domain of address identification information B, a writing motion made up of p pieces of coordinate address information is detected, each writing motion can be expressed as (writing motion 1), (writing motion 2), and (writing motion 3) below.

> [address identification information A]-[coordinate address information 1]-[coordinate address information 2]- ... -[coordinate address information m-1]-[coordinate address information m]     (Writing Motion 1)
>
> [address identification information A]-[coordinate address information 1]-[coordinate address information 2]- ... -[coordinate address information n-1]-[coordinate address information n]     (Writing Motion 2)
>
> [address identification information B]-[coordinate address information 1]-[coordinate address information 2]- ... -[coordinate address information p-1]-[coordinate address information p]     (Writing motion 3)

Figure 4A:
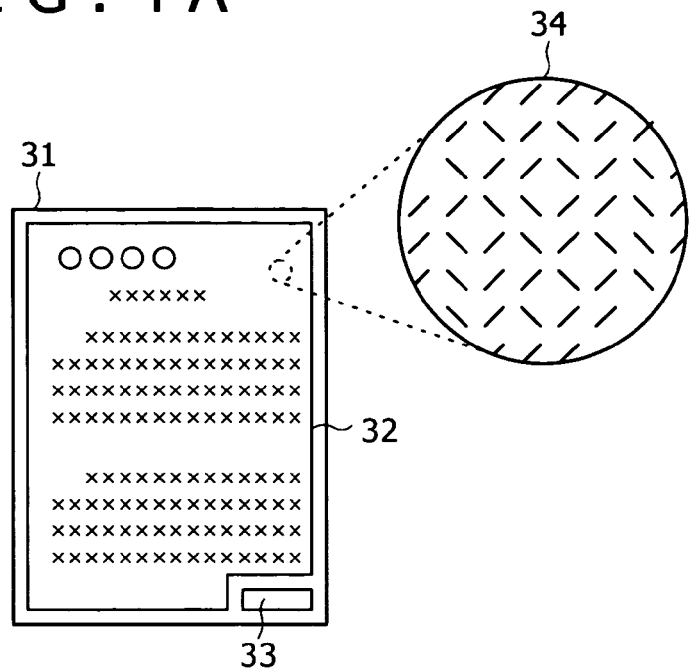
FIGS. 4A and 4B illustrate medium examples in which a two-dimensional code has been embedded.
Figure 4B:
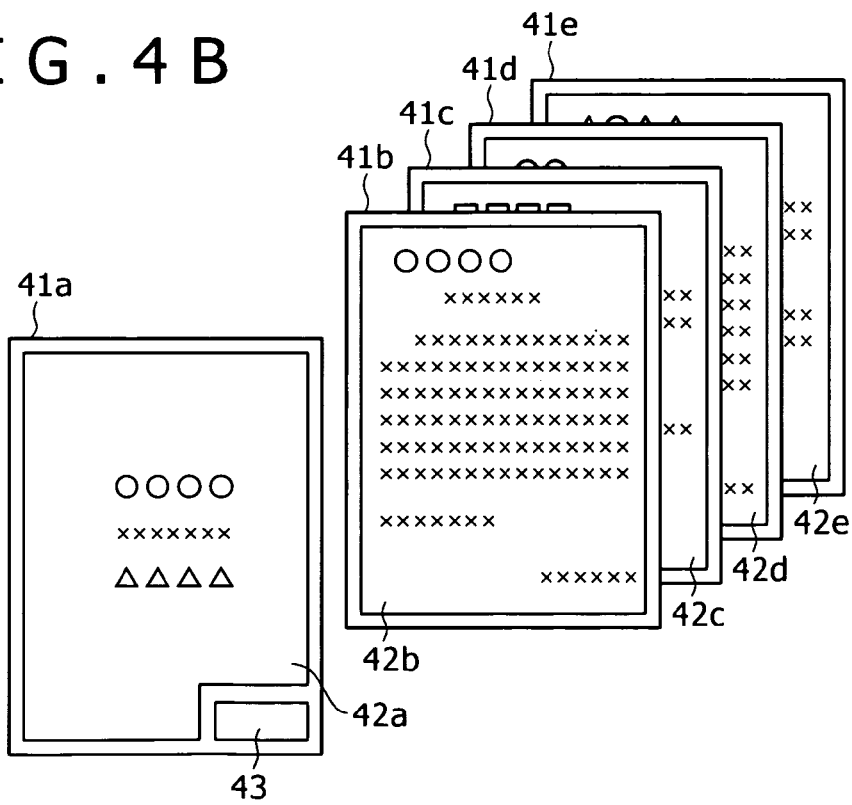

FIGS. 4A and 4B illustrates medium (paper) examples in which a two-dimensional code representing coordinate address information and address identification information have been embedded in the surface.

In FIG. 4A, a single-sheet document example is illustrated; specifically, a medium (paper) 31 example having an area 32 where coordinate address information has been embedded and a space 33 where address identification information has been embedded and, in addition, an enlarged view 34 of a part of the area 32 where coordinate address information has been embedded are shown.

In FIG. 4B, a document example made up of plural sheets is illustrated; specifically, plural sheets of medium (paper) 41a, 41b, 41c, 41d, and 41e are shown, wherein the pages respectively have areas 42a, 42b, 42c, 42d, and 42e where coordinate address information has been embedded and only the cover (medium (paper) 41a) includes a space 43 where address identification information has been embedded.

On each page of medium (paper) 31, 41a through 41e, a two-dimensional code representing coordinate address information for locating a point within the page is embedded by being printed in the background of the document. In this example, the two-dimensional code is made up of backslash "\" (left-top diagonal line) pattern images, each indicating bit 0, and slash "/" (right-top diagonal line) pattern images, each indicating bit 1. The size of each pattern image is approximately 4 dots by 4 dots at 600 dpi (dots per inch) and an interval between one pattern image and another is approximately 6 dots at 600 dpi. It is hard for the human eye to distinguish pattern figures and these patterns look like a gray image with an even density (if the pattern images are printed in black) superimposed over the background of the document.

In an margin of the medium (paper) page 31 of the single-sheet document or a cover of the medium (paper) pages of the plural-sheet document 41a, a two-dimensional code of address identification information for identifying coordinate address information is printed on a part of the paper. In this example, the two-dimensional code representing the address identification information is also made up of backslash "\" pattern images, each indicating bit 0, and slash "/" pattern images, each indicating bit 1, as is the case for the two-dimensional code representing the coordinate address information. The size of each pattern image is approximately 4 dots by 4 dots at 600 dpi and an interval between one pattern image and another is approximately 6 dots at 600 dpi. It is hard for the human eye to distinguish pattern figures and these patterns look like a gray image printed with an even density (if the pattern images are printed in black).

For a plural-sheet document, address identification information may be configured to be printed on only a part of the plural pages, such as on the cover of the document like this example or on the last page of the document, though address identification information may be printed on each page. In this configuration, coordinate address information is printed so that duplication of coordinate address information will not occur across a series of pages.

For explanatory purposes using the drawing, in this example, the areas where coordinate address information or address identification information has been embedded are shown as being visible images. However, for example, the areas of coordinate address information and/or address identification information can be made as invisible images. As the invisible images, for example, those that are reactive to infrared light that is invisible to the human eye can be used. If the area where the address identification information has been embedded is made invisible, the boundaries of the area may be delimited by visible marking so that the area can easily recognized by the user.

The two-dimensional code is imaged as the one composed of slash/backslash pattern combinations in this example; however, its imaging is not limited so.

To represent coordinate address information and address identification information, not only the two-dimensional code but also, for example, bar code and other types of code may be used.

Address identification information is read by scanning the area where the information has been embedded with the pen-type scanner 1 by the user; however, reading address identification information can be performed in other ways. To realize this, various arrangements are possible; for example, a check box is provided in place to be checked with the pen-type scanner 1; in addition to the check box, a message to prompt the user to check it when appropriate is described; reading is allowed by putting the user's signature in place with the pen-type scanner 1: and, in addition to the signature field, a message to prompt the user to put signature.

Other examples of possible arrangements to distinguish between coordinate address information and address identification information are as follows. Bit information to identify the type of information is embedded in coordinate address information and/or address identification information. Alternatively, different code representations are used for coordinate address information and address identification information; for example, coordinate address information is represented by combination of the two forms of pattern images of slashes and backslashes, as in this example, and address identification information is represented by combination of vertical bar "|" pattern images and horizontal bar "-" pattern images.

While, in this example, the arrangement to represent coordinate address information and address identification information by combination of the two forms of pattern images is illustrated; other arrangements in which the information may be represented by combination of, for example, three or more forms of pattern images may be used.

Address identification information may be read by, for example, scanning a point on a paper page with the pen-type scanner 1, scanning a line on the page with the pen-type scanner 1, or scanning while a character or the like is written with the pen-type scanner 1.

As an example, such an arrangement can be used that certain codes are printed repeatedly in the area where address identification information is embedded and address identification information is identified, based on the result of reading one or more codes thus printed with the pen-type scanner 1.

As another example, the following arrangement is also possible: codes made up of "an index, address identification information, and an extension" are arranged sequentially or randomly; from information read with the pen-type scanner 1, by finding a code for extension 1, a code for extension 2, and a code for extension 3 and concatenating address identification information parts 1, 2 and 3 included in each of these codes, address identification information is detected as the concatenation.

Figure 5:
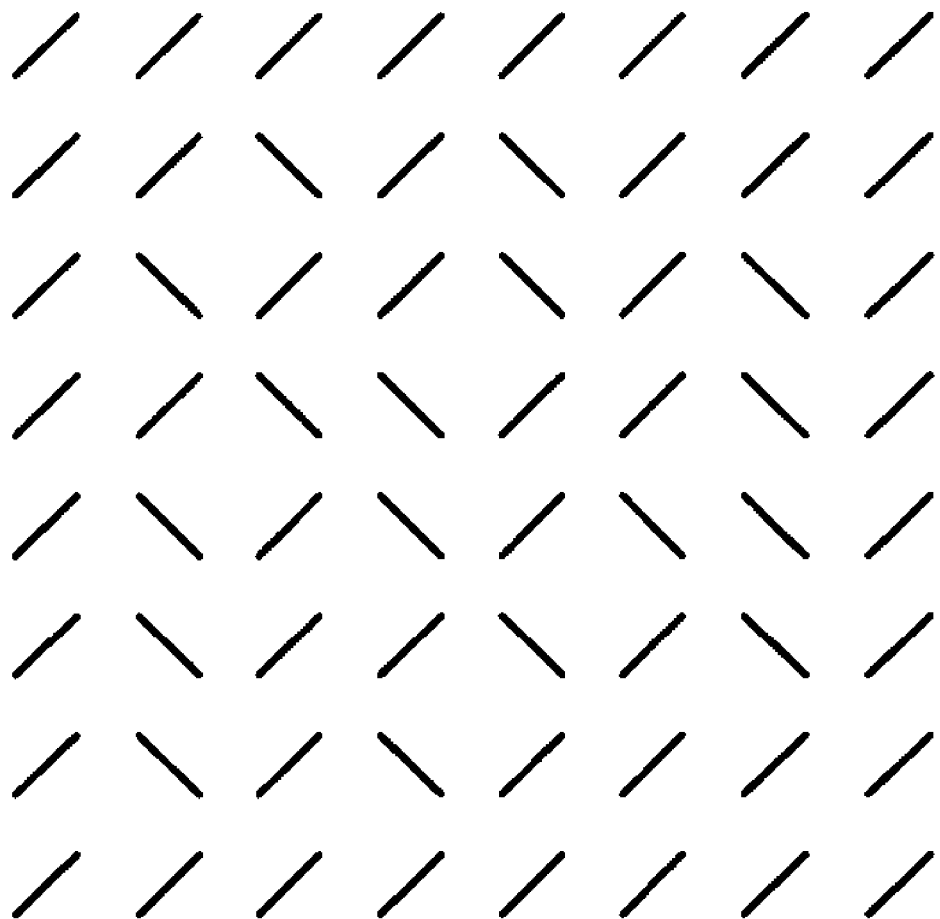
FIG. 5 illustrates an example of a two-dimensional code.

FIG. 5 illustrates an example of a composition of one unit of two-dimensional code involved in the present embodiment.

In this example, the two-dimensional code corresponding to coordinate address information embedded in a paper page and the two-dimensional code corresponding to address identification information embedded are made up of combinations of the two forms of bit pattern images.

For example, when the two-dimensional code containing coordinate address information or address identification information is embodied in an 8×8 matrix (a square in this example) made up of combinations of the two forms of bit pattern images, coordinate address information can be embedded at intervals of about 2 mm (6 dots/bit pattern×8 dots) in a paper page.

In the example of FIG. 5, there are identical pattern images in the uppermost row and the leftmost column, which are used as a synchronous code, and the pattern images in the remaining part specify information.

FIG. 6 illustrates an example of coordinate address information represented by a two-dimensional code embedded in a medium.

On a paper page, in an area where coordinate address information has been embedded, a two-dimensional code is arranged, as shown in FIG. 5, throughout the area of the page, so that no duplication of coordinate addresses represented by each unit of two-dimensional code will occur on the page.

Specifically, in the example of FIG. 6, each unit of two-dimensional code represents one of coordinate addresses such as A1, A2, etc. and B1, B2 and a position on the paper page is located by one of these different coordinate address pieces.

Figure 7:
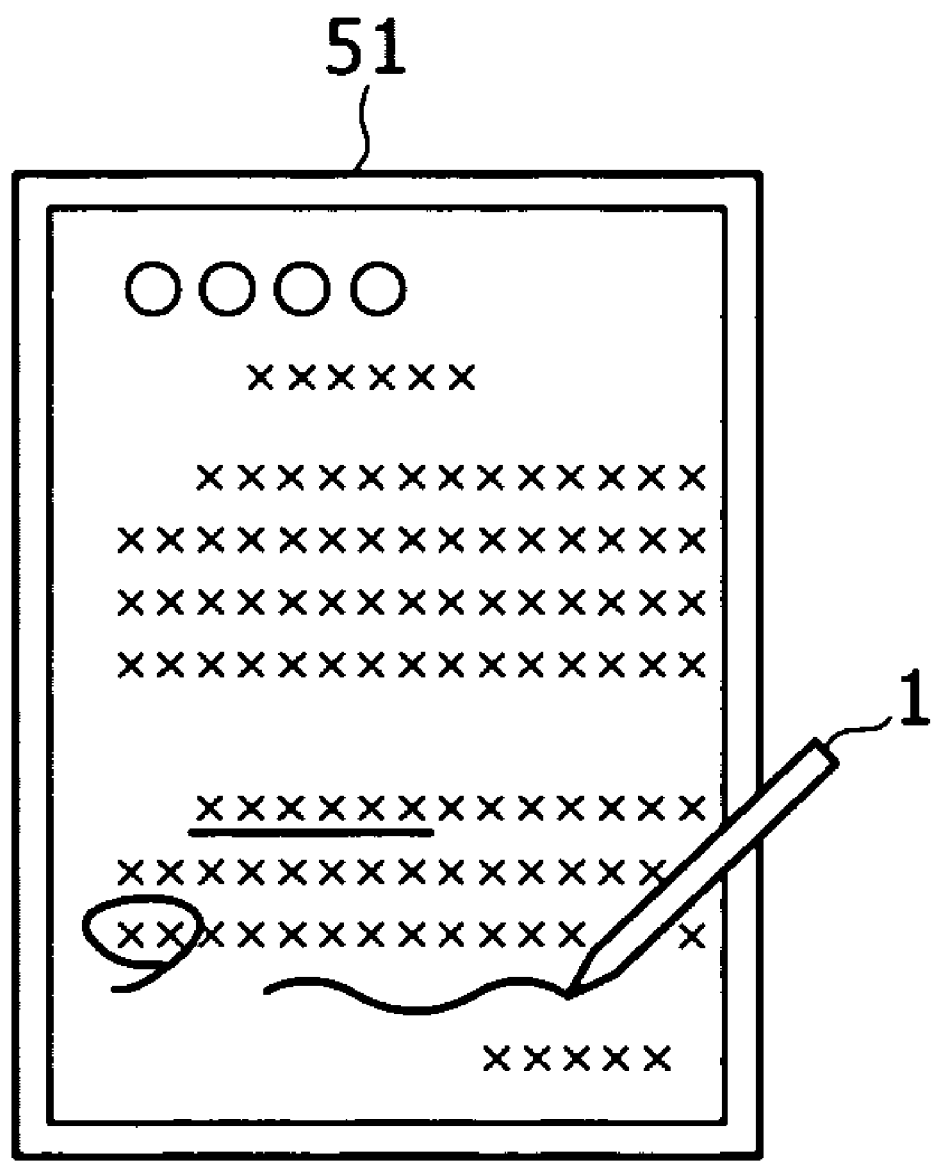
FIG. 7 illustrates an example of a writing action performed on the medium.

FIG. 7 illustrates an example of a writing action performed with the pen-type scanner 1 which is used as a specialized pen on a paper (medium) page 51.

Figure 8:
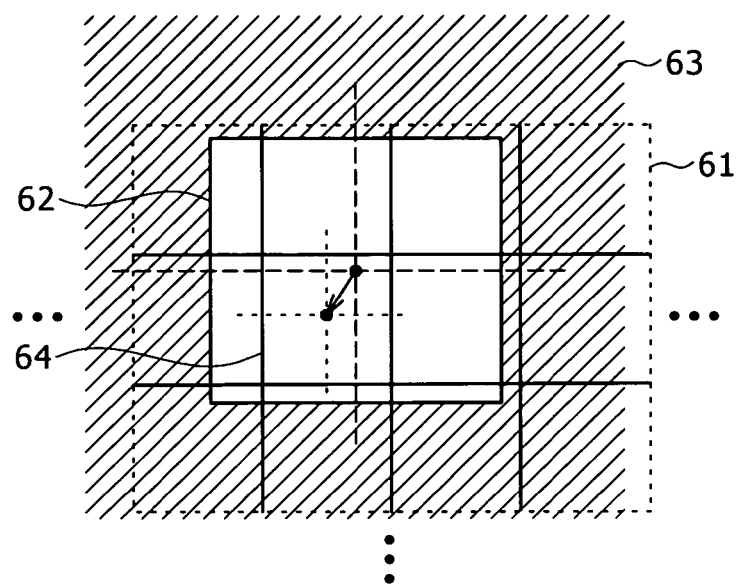
FIG. 8 illustrates an example of an image that is input by an image input part of a specialized pen.

Referring to FIG. 8, how an image is input by the image input part 13 of the pen-type scanner 1 is explained.

In FIG. 8, a two-dimensional code (with partitions of two-dimensional code) 61 created on a paper page, an area 62 within which an image is captured by the image input part 13 (image capturing area), an area 63 where an image is not captured by the image input part 13 (non-captured area), and a two-dimensional code (with partitions of two-dimensional code) 64 that is detected within the image capturing area 62 are shown.

In this example, the image input part 13 is arranged to capture an image area for two or more units of two-dimensional code in vertical and horizontal directions. This arrangement makes it possible to include at least one image of a two-dimensional code in the image capturing area 62 of the image input part 13. The code information obtaining part 14 decodes the two-dimensional code image which has been input from the image input part 13. Thereby, it can obtain embedded coordinate address information (or address identification information) corresponding to the two-dimensional code within the image capturing area 62. Furthermore, by detecting a misalignment distance by which the captured two-dimensional code image is out of the frame of the image capturing area 62, location information obtained by the writing motion tracing device (pen-type scanner 1 in this example) can be corrected to more accurate location information.

Figure 9:
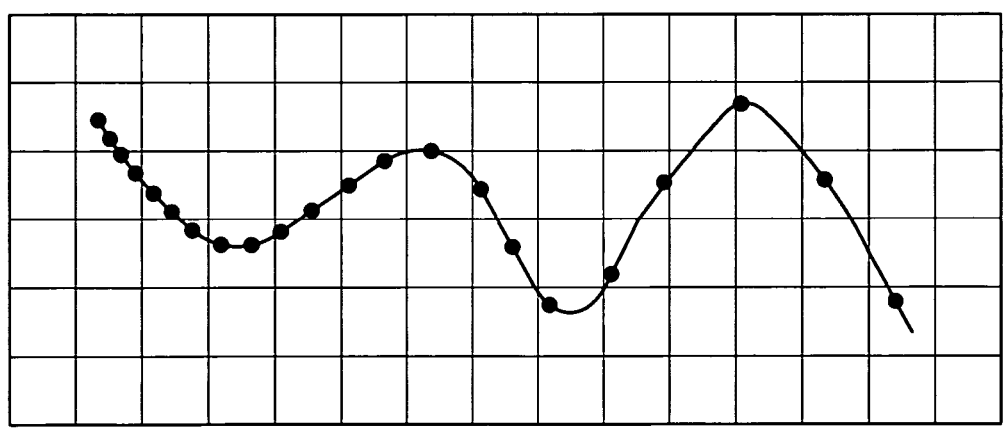
FIG. 9 illustrates an example of a writing motion trace detected.

FIG. 9 illustrates an example of a writing motion trace detected during a scan over a two-dimensional code created on a paper page with the pen-type scanner 1.

Figure 10:
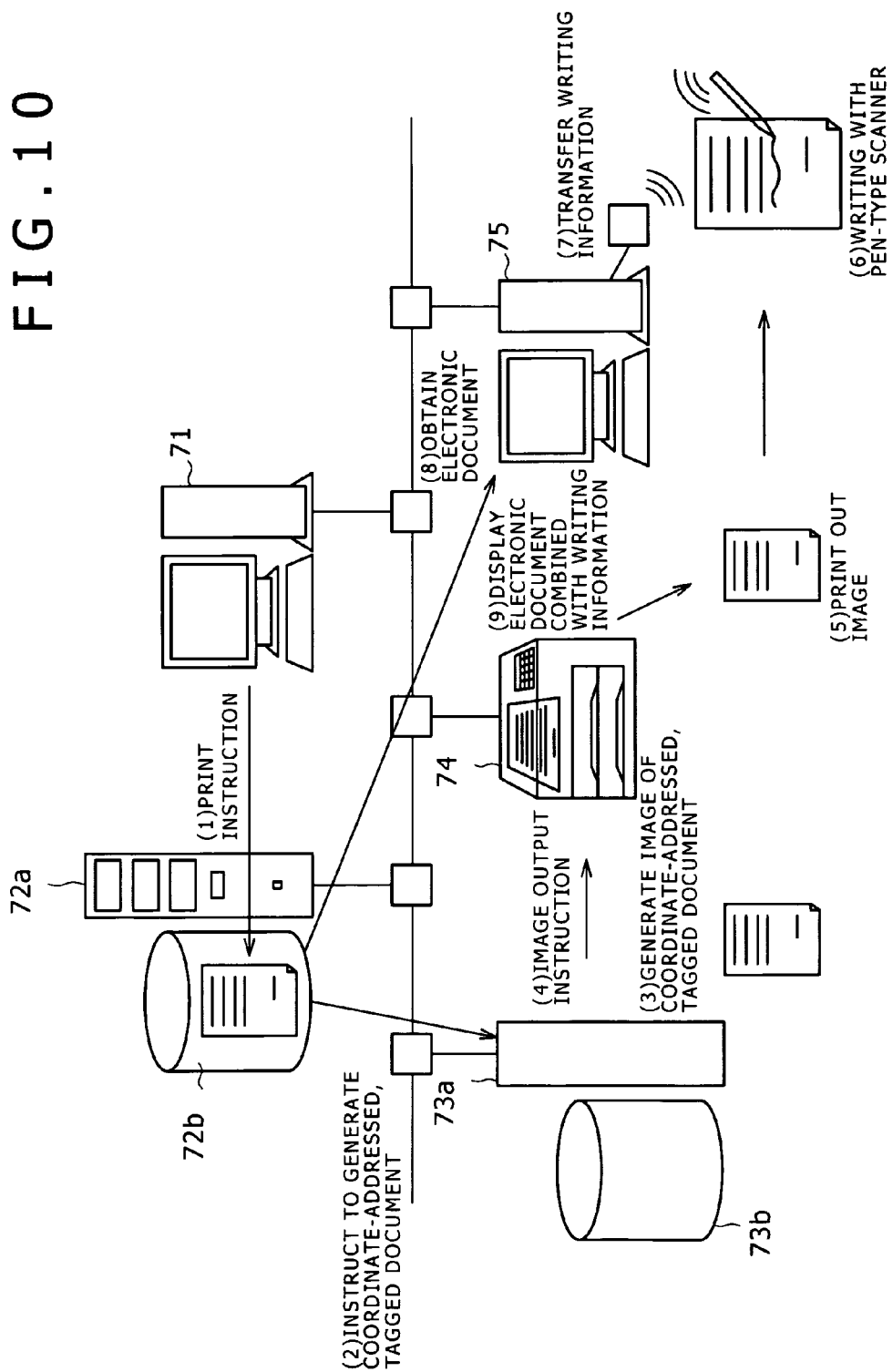
FIG. 10 illustrates an example of an image processing system.

FIG. 10 illustrates an example of an image processing system to which image generation and image reading according to the present embodiment are applied.

The image processing system of this example is composed of a terminal device 71 that generates (prints) document images, a document server 72a, a document repository 72b, a server 73a generating a document image, which functions as a device that manages coordinate addresses (address managing device), a coordinate address database (DB) 73b, an image forming device 74 such as a printer or hybrid imaging equipment, a terminal device 75 that reads document images, and a network 76 that connects these components and allowing for communication among the components. The terminal devices 71, 75 are, for example, PCs.

An example of processing that is performed by the image processing system is now presented.

Document information to be printed is stored in the document repository 72b provided on the document server 72a on the network 76.

When the terminal device 71 sends an instruction to print document information existing in the document repository 72b to the document server (process 1), the document server sends an instruction to generate a coordinate-addressed, tagged document to the server 73a generating an image of a coordinate-addressed, tagged document (process 2).

The server 73a generating an image of a coordinate-addressed, tagged document retrieves coordinate address information required for an electronic document requested to be generated from the address space stored in the coordinate address information DB 73b combines the above information and address identification information into a document image, and thus generates a coordinate-addressed, tagged document image (process 3).

Here, as the address identification information, for example, any of the following can be used: a bit string that increments each time coordinate address information is issued; terminal device attribute information such as the IP address or client name of the terminal device 71 that issued the print instruction; electronic document attribute information such as information about the storage location of the electronic document to be printed; server attribute information such as the IP address of the server 73a generating an image of a coordinate-addressed, tagged document; and image forming device attribute information such as the IP address or serial number of the image forming device 74.

The server 73a generating an image of a coordinate-addressed, tagged document transmits the image data to a pre-configured image forming device 74 (process 4). This image data is printed out by the image forming device 74 (process 5).

The user writes on a paper page of the document thus printed out with the pen-type scanner 1 (process 6). Information written on the page is transferred from the pen-type scanner 1 to the terminal device 75 that reads images via USB, Bluetooth, or other similar function (process 7). Thereby, the terminal device 75 that reads images can obtain address identification information and coordinate address information that have been read by the pen-type scanner.

If, for example, the storage location of an electronic document is used as the address identification information, the terminal device 75 can obtain that electronic document from the document server 72a by using this information (process 8). Then, the terminal device 75 can display the obtained electronic document information combined with writing (motion) information such as written characters with the pen-type scanner 1 on its display screen (process 9).

Information for decoding the obtained coordinate address information and address identification information may be stored in an arbitrary device. A decoder decodes the coordinate address and address identification information, based on the decoding-relevant information stored in it or obtained from another device where the decoding-relevant information has been stored.

Figure 11:
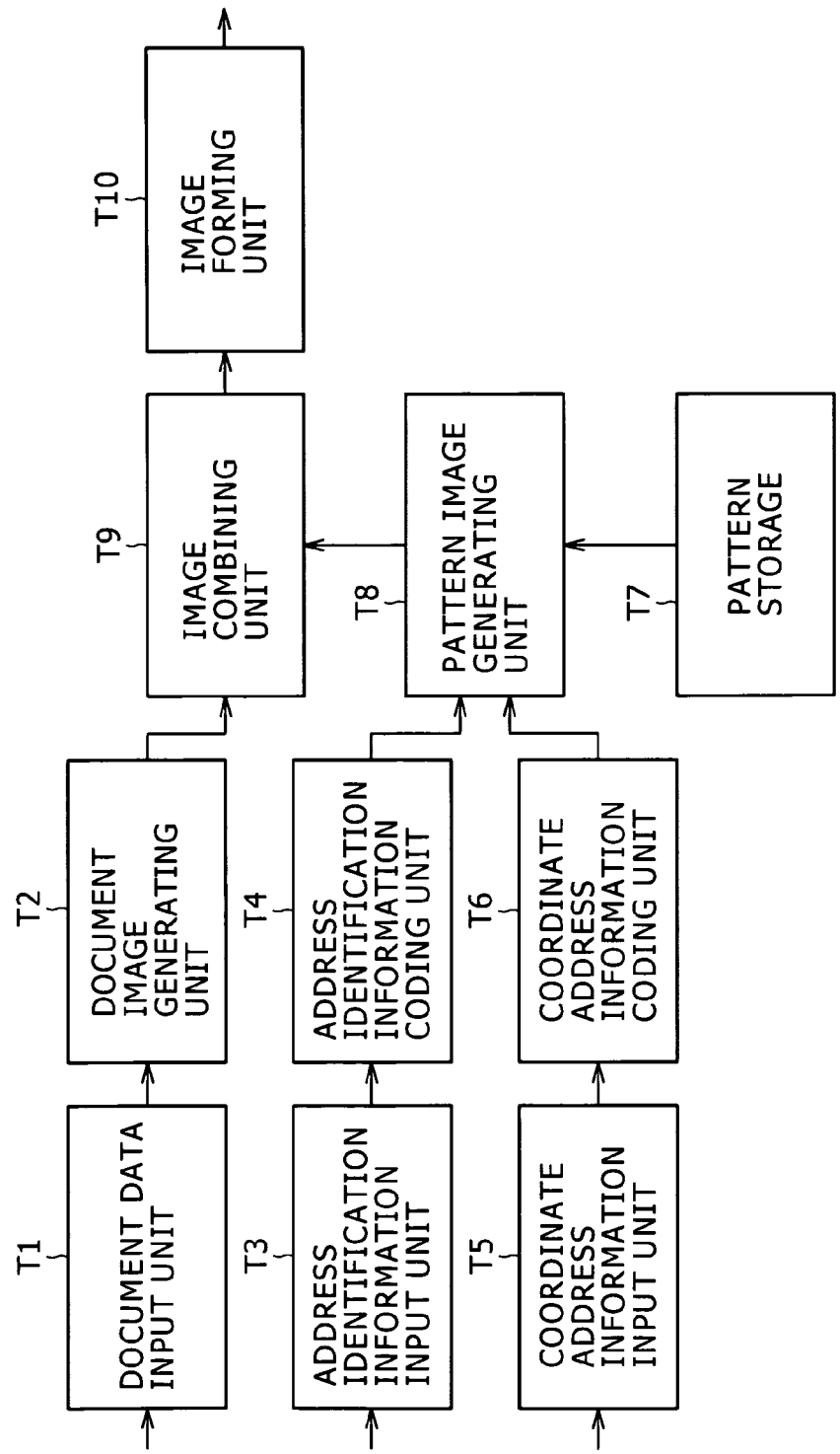
FIG. 11 illustrates an example of a procedure for generating an image of a coordinate addressed, tagged document.

Referring to FIG. 11, an example of a procedure for generating an image of a coordinate-addressed, tagged document is now presented.

A document data input unit T1 inputs electronic document data to be printed. From this electronic document data, a document image generating unit T2 generates a document image to be printed out. An address identification information input unit T3 inputs address identification information which is, for example, the storage location of the electronic document and may be other attribute information. An address identification information coding unit T4 codes the address identification information into a two-dimensional code. A coordinate address information input unit T5 inputs coordinate address information to be embedded in the background of a document page. A coordinate address information coding unit T6 codes the coordinate address information into a two-dimensional code. Based on pattern information stored in a pattern storage T7, a pattern image generating unit T8 refers to the bit values of the coded two-dimensional code, retrieves bit pattern images corresponding to the bit values from the pattern storage T7, and generates a two-dimensional code images. An image combining unit T9 combines the document image with the address identification information and coordinate address information and an image forming unit T10 prints out the composite image. In the thus generated image, an image of the document combined with the coordinate address information and address identification information is formed.

The above units T1 to T10 may be integrated into a single device or distributed across plural devices.

As above, the coordinate-addressed, tagged document image generating apparatus or method of the present embodiment generates coordinate address image data in which coordinate addresses by which a position can be located on a document page image are converted into machine-readable code images and address identification image data in which address identification information for identifying coordinate address information is converted into machine-readable code images, combines the document data with the coordinate address image data and the address identification image data, and generates a document image from the composite data. In this way, the device or method generates, based document data to be printed, coordinate-addressed, tagged images of pages, in which a position on a page image can be located by reading the machine-readable code embedded in the background of the page image.

In the present embodiment, a two-dimensional code (coordinate address image data) containing coordinate address information is printed in a page area where the coordinates need to be addressed and a two-dimensional code (address identification image data) containing address identification information is printed in a page area where the coordinates need not to be addressed. In this embodiment, a two-dimensional code representing coordinate address information is at least required to be capable of representing coordinate addresses throughout a page. Distinguishing between the coordinate addresses on one page and corresponding coordinate addresses printed on another page can be made by address identification information that is printed on each page. Therefore, for example, because a two-dimensional code representing coordinate address information can be made smaller, the size of the image capturing element that is installed on the pen-type scanner 1 can be made smaller. Also, for example, by increasing the size of address identification information, the size of coordinate address information that can be represented can be expanded drastically.

In the coordinate-addressed, tagged document apparatus or method of the present embodiment, address identification information includes, for example, document data attribute information.

In this embodiment, by the address identification information including the attribute information for original electronic document data, the original electronic document corresponding to a paper document to which writing has been added can easily be searched out. For example, it is possible to obtain the electronic document identified by the address identification information and incorporate writing information into the electronic document in an annotation form or the like.

A variety of document data attribute information may be used, including, for example, the storage location of a document, document name, a hash value assigned to the document, document ID, etc.

In the coordinate-addressed, tagged document image generating apparatus or method of the present embodiment, address identification information includes, for example, the attribute information of an image forming device that prints out document data document.

In this embodiment, by the address identification information including the attribute information of an image forming device that prints out original electronic document data, the image forming device that printed out a paper document to which writing has been added can be identified. When, for example, a confidential document has been printed, a printer or the like that printed the confidential document can be identified and security can be enhanced.

A variety of attribute information of an image forming device may be used, including, for example, the device serial number, IP address, MAC address, etc.

The coordinate-addressed, tagged document image generating apparatus or method of the present embodiment obtains coordinate address information from, for example, an address managing device (for example, a sever) connected to the apparatus via the network.

If, for example, a two-dimensional code is configured to have vast coordinate address information for a series of plural pages, care has to be taken not to duplicate, across the pages, coordinate address information to be printed on each page. In this embodiment, coordinate address information is obtained from the address managing device on the network and, therefore, coordinate addresses are issued and can be managed consistently by the address managing device and coordinate addresses without duplication can easily be managed.

In the coordinate-addressed, tagged document image generating apparatus or method of the present embodiment, address identification information includes, for example, attribute information of an address managing device.

In this embodiment, if there are plural address managing devices and address management is conducted in a tree structure, like a Domain Name System (DNS), by the address identification information including the attribute information of an address managing device, the address managing device that issued coordinate address information printed on a paper document to which writing has been added can be identified. When, for example, a confidential document has been printed, by identifying the address managing device that issued coordinate address information printed on the confidential document, the printer, terminal device (e.g., client PC), etc. that printed out the confidential document can be identified by checking the access log on the address managing device or other methods and security can be enhanced.

A variety of attribute information of an address managing device may be used, including, for example, the device's IP address, MAC address, etc.

The coordinate-addressed, tagged document image generating apparatus or method of the present embodiment obtains coordinate address information from, for example, a terminal device (e.g., client PC) that issues an instruction to print document data.

In this embodiment, coordinate address information is managed on the terminal device and this manner enables even a personal user that is not always connected to the network to obtain writing information.

In the coordinate-addressed, tagged document image generating apparatus or method of the present embodiment, address identification information includes, for example, attribute information of a terminal device.

In this embodiment, by the address identification information including the attribute information of a terminal device that issues an instruction to print out original electronic document data, the terminal device that issued the instruction to print the document onto paper pages can be identified. When, for example, a confidential document has been printed, the terminal device that issued the instruction to print out the confidential document can be identified and security can be enhanced.

A variety of attribute information of a terminal device may be used, including, for example, the device's IP address, MAC address, etc.

The coordinate-addressed, tagged document image generating apparatus or method of the present embodiment uses, for example, coordinate addresses in a domain smaller than a finite address space whose size is determined by the number of information bits of a machine-readable code containing coordinate address information.

In this embodiment, the domain of coordinate address information that is sequentially printed on one medium (paper) page is smaller than the address space that can be represented by the number of information bits that can be contained in a two-dimensional code (if an error correction code is included in a two-dimensional code, the number of information bits=code length bits−check bits). If, for example, the information bits are 32 bits, combinations of information bits that can be contained in a two-dimensional code are 4,294,967,296 ($2^{32}$), whereas the number of coordinate addresses is 15,593.

That is, in this embodiment, there is a relation {coordinate addresses that are sequentially printed on one medium (paper) page<<whole address space}. For a document made up of plural pages, such as a report, the following arrangement can be made: different coordinate addresses are printed on each page, whereas address identification information is printed in a space on the cover or the like of the document having plural pages without being printed on each page.

In the coordinate-addressed, tagged document image generating apparatus or method of the present embodiment, for example, coordinate address image data is printed as invisible images.

In this embodiment, by making coordinate address image data invisible, the visibility of printed text and writing information can be enhanced.

In the coordinate-addressed, tagged document image generating apparatus or method of the present embodiment, for example, address identification information is printed as invisible images and a visible image to indicate the area where address identification information has been printed is printed.

In this embodiment, by making address identification information invisible on a print page, a neat appearance of the print page can be presented to the viewer who may be confused by the presence of visible tag information. If the address identification image data is made invisible, it is likely that the user cannot know what place to be scanned (address identification information position) by the pen to identify coordinate address information, the place to be scanned may be delimited by a visible circle or rectangle, so that the user can easily find that place.

In the coordinate-addressed, tagged document image generating apparatus or method of the present embodiment, for example, address identification image data is printed as visible images.

In this embodiment, by making address tag image visible, the place to be scanned (address identification information position) by the pen to identify coordinate address information becomes easy to find and usability can be enhanced.

The coordinate-addressed, tagged document image reading apparatus or method of the present embodiment reads coordinate address image data and address identification image data from a document image generated by the coordinate-addressed, tagged document image generating apparatus or method of the present embodiment, decodes the read image data, and, thereby, can detect the motion of the pen-type scanner 1 (when writing a character or the like). If, for example, address identification information is mapped to the attribute information of a document or device, the document or device corresponding to the read address identification information can be identified.

In the present embodiment, the server 73a generating a document image is configured as the image generating apparatus, including a function to generate an image of a document or the like to be printed, configured as a print object image generating unit, a function to generate an image for coordinate address information, configured as a coordinate address information image generating unit, a function to generate an image for address identification information, configured as an address identification information image generating unit, a function to generate a composite image in which these images are combined (a coordinate-addressed, tagged document image in the present example), configured as a composite image generating unit, a function of communication via the network 76, configured as a network communication unit, and a function to retrieve coordinate address information and address identification information from the coordinate address DB 73b, configured as an information obtaining unit.

In the present embodiment, the terminal device 71 is configured as the device that issues a print instruction, the image forming device 74 is configured as a printing device, and the server 73a generating a document image and the coordinate address information DB 73b are configured as a device that manages coordinate address information and address identification information.

In this embodiment, the pen-type scanner 1 and the terminal device 75 are configured as the image reading apparatus, including a function to read coordinate address information images and address identification information images from the medium (paper), configured as an image detecting unit, a function to locate positions on which reading is performed and a reading motion, based on the result of reading, configured as a locating unit, and a function to display the image of a document or the like printed onto the medium (paper) combined with the image of reading positions or motion on a display screen, configured as an image display.

As described above, an image generating apparatus of the present invention generates an image by the following scheme:

A composite image generating unit generates a composite image in which an image of an object to be printed onto a medium is combined with an image for coordinate address information for locating a position on the medium and an image for address identification information for identifying the coordinate address information.

Thus, the use of combination of coordinate address information and address identification information identifying coordinate addresses enables effective expansion of the address space that can be represented; for example, this combination can expand the address space in which the addresses of coordinates can be represented without affecting the address detection performance.

For example, by coordinate address information on one page or a series of pages of a medium, a relative position on the medium can be identified and, by combination of the coordinate address information and address identification information, an absolute position across the whole document including other pages or other series of pages can be identified.

Herein, as the medium, for example, paper is used; however, other types of media may be used.

What is printed on the medium may be documents, drawings, and other various forms of information.

Various forms of coordinate address information and address identification information may be used.

Various forms of images for coordinate address information and images for address identification information may be used; for example, coordinate address information and address identification information may be embedded in the same style of code images or different styles of code images.

As an example of configuration, the image generating apparatus of the present invention may be configured as follows:

a print object image generating unit generates the image of an object to be printed, a coordinate address information image generating unit generates the image for coordinate address information, an address identification information image generating unit generates the image for address identification information, and the composite image generating unit generates a composite image in which the generated image of an object to be printed is combined with the image for coordinate address information and the image for address identification information.

Thus, the apparatus generates the image of an object to be printed, the image for coordinate address information, and the image for address identification information and can generate a coordinate-addressed, tagged image into which these images are combined.

Herein, the object to be printed such as document data is obtained from, for example, an internal memory of the image generating apparatus or an external device and the image of the object to be printed is generated from the obtained data.

The coordinate address information and address identification information is obtained from information stored in, for example, an internal memory of the image generating apparatus or an external device's memory and the images for the obtained coordinate address information and address identification information are generated.

In the image generating apparatus of the present invention, the composite image generating unit may generate a composite image in which the image for coordinate address information and the image for address identification information are laid in different areas on the medium.

Thus, since the image for coordinate address information and the image for address identification information are laid in different areas on the medium, it is easy to read both images separately.

The image for coordinate address information and the image for address identification information may be laid in variable areas on the medium.

The image of an object to be printed may be laid in, for example, the same area as for the image for coordinate address information and the image for address identification information, or in a different area, or in an area overlapping with another area.

In the image generating apparatus of the present invention, the composite image generating unit may generate a composite image in which the image for address identification information is laid in a particular space in a margin of the medium and the image for coordinate address information is laid in the remaining area of the medium.

Thus, by laying the address identification information in a margin of the medium, for example, it is possible to detect a relative position in the remaining area occupying a most part of a medium page by the coordinate address information and locate an absolute position in conjunction with the address identification information.

Herein, the shape of the particular space in a margin of the medium page may be varied; for example, a square, rectangle, oval figure, etc.

In the image generating apparatus of the present invention, the medium may be made up of plural pages of paper and the composite image generating unit may generate a composite image in which the image for address identification information is printed onto one of the plural sheets.

Thus, address identification information common to the plural sheets is attached to one sheet and a relative position on the plural sheets can be identified by coordinate address information.

Herein, a page to which address identification information is attached may be a cover, a back cover, or any other page.

Alternatively, address identification information may be attached to only two or more sheets of the plural sheets, but not all the sheets.

In the image generating apparatus of the present invention, the composite image generating unit may generate a composite image in which the image for coordinate address information is printed as an invisible image (to a person).

Thus, because the image for coordinate address information on the medium is invisible to a person, for example, when the image of the object to be printed such as a document is superimposed on the image for coordinate address information, the document or the like can be made easy to view.

Printing the image for coordinate address information as an invisible image is specified, for example, by information about print styles of the composite image.

In the image generating apparatus of the present invention, the composite image generating unit may generate a composite image in which the image for address identification information is printed as an invisible image (to a person) and a visible image (to a person) to indicate a position printing of the address identification information is printed. In this case, the composite image into which the image to indicate the print position is incorporated is generated.

Thus, the address identification information on the medium is invisible to a person, but the image to indicate its print position is visible to a person, for example, with the result that the image for address identification information on the medium can easily read by manually operating the specialized pen or the like.

Herein, the image to indicate the print position of address identification information may appear in diverse forms, for example, a predetermined message, a predetermined frame, an underline for signature, etc.

Printing the image for address identification information as an invisible image is specified, for example, by information about print styles of the composite image.

In the image generating apparatus of the present invention, the composite image generating unit may generate a composite image in which the image for address identification information is printed as an visible image.

Thus, in this case, address identification information is visible to a person, for example, with the result that the image for address identification information on the medium can easily read by manually operating the specialized pen or the like.

In the image generating apparatus of the present invention, the address identification information may include attribute information of a device that issues an instruction to print onto the medium.

Thus, by the address identification information read from the medium, the device that issues the instruction to print can be identified; for example, security enhancement or the like will be achieved.

Herein, as the device that issues a print instruction, for example, a personal computer or the like that operates as a client can be used.

A variety of document data attribute information may be used, including, for example, the device name, address, etc.

In the image generating apparatus of the present invention, the address identification information may include attribute information of a device that prints onto the medium.

Thus, by the address identification information read from the medium, the device that printed the page or pages can be identified; for example, security enhancement or the like will be achieved.

Herein, as the device that prints, for example, a printer, hybrid imaging equipment, etc. can be used.

In the image generating apparatus of the present invention, the address identification information may include attribute information of a device (managing device) that manages the coordinate address information and the address identification information.

Thus, the address identification information read from the medium, the managing device can be identified; for example, security enhancement or the like will be achieved.

Herein, as the managing device, for example, a computer or the like that operates as a server can be used.

In the image generating apparatus of the present invention, the address identification information may include attribute information of the object to be printed.

Thus, by the address identification information read from the medium, the printed document itself or the like (object printed) or its storage location can be identified; for example, this information can be used to obtain data of the document or the like.

Herein, a variety of document attribute information may be used, including the document name, storage location, etc.

In the image generating apparatus of the present invention, an information obtaining unit may obtain the coordinate address information and the address identification information from the device that issues a instruction to print onto the medium.

Thus, using the coordinate address information and address identification information held on the device that issues the instruction to print, the apparatus can generate a composite image.

The image generating apparatus of the present invention may be equipped with a network communication unit that performs communication via a network and an information obtaining unit may obtain the coordinate address information and the address identification information from the device that manages the coordinate address information and the address identification information via the network.

Thus, the apparatus can generate a composite image by using the coordinate address information and address identification information held on the managing device that consistently manages the coordinate address information and the address identification information which are used, for example, in a predetermined range.

An image reading apparatus of the present invention reads an image by the following scheme:

An image detecting unit, from a medium having a composite image printed thereon in which an image of an object to be printed onto the medium is combined with an image for coordinate address information for locating a position on the medium and an image for address identification information for identifying the coordinate address information, reads the image for coordinate address information and the image for address identification information. A locating unit locates positions on which the reading is performed, based on the image for coordinate address information and the image for address identification information read by the image detecting unit.

Thus, by combination of address identification information and coordinate address information, positions on which the specialized pen is moved and a motion of the pen (a set of changing positions) can be identified.

Herein, the image reading apparatus can be configured by using, for example, a pen-type scanner. As an example, when the user writes a letter or the like on the medium with the pen-type scanner, the scanner reads coordinate address information on the medium. When the user checks or signs in a given area with the pen-type scanner, the scanner reads address identification information on the medium. Based on both address and tag information, the scanner locates a motion of writing a letter or the like.

In the image reading apparatus, an image display may display the image of the object printed on the medium, combined with an image representing a reading motion based on the positions located by the locating unit, on a screen.

Thus, it is possible to display the image of the object printed such as a document, into which the image of characters or the like written on the printed page (the image of a motion) are incorporated, so as to be viewable.

The image detecting unit, locating unit, and image display, for example, may be integrated into a single device or distributed across separate components; in the latter case, these plural components may constitute the image reading apparatus.

The present invention can provide methods, programs, and storage media having the same gist as the above-described apparatuses.

By way of example, an image generating method generates an image by an image generating apparatus as follows:

A composite image generating unit provided on the image generating apparatus generates a composite image in which an image of an object to be printed onto a medium is combined with an image for coordinate address information for locating a position on the medium and an image for address identification information for identifying the coordinate address information.

By way of example, the present invention provides a storage medium storing a program which is executed by a computer configured as an image generating apparatus and which is readable by an input unit of the computer.

The program includes instructions causing the computer to perform the following processes: generating an image of an object to be printed on a medium; generating an image for coordinate address information for locating a position on the medium; generating an image for address identification information for identifying the coordinate address information; and generating a composite image in which the image of an object to be printed is combined with the image for coordinate address information and the image for address identification information.

By way of example, an image reading method of the present invention reads an image by an image reading apparatus as follows:

An image detecting unit provided on the image reading apparatus, from a medium having a composite image printed thereon in which an image of an object printed onto the medium is combined with an image for coordinate address information for locating a position on the medium and an image for address identification information for identifying the coordinate address information, reads the image for coordinate address information and the image for address identification information. A locating unit provided on the image reading apparatus locates positions on which the reading is performed, based on the image for coordinate address information and the image for address identification information read by the image detecting unit.

By way of example, the present invention provides a storage medium storing a program which is executed by a computer configured as an image reading apparatus and which is readable by an input unit of the computer.

The program includes instructions causing the computer to perform the following processes: from a medium having a composite image printed thereon in which an image of an object printed onto the medium is combined with an image for coordinate address information for locating a position on the medium and an image for address identification information for identifying the coordinate address information, reading the image for coordinate address information and the image for address identification information, and locating positions on which the reading is performed, based on the image for coordinate address information and the image for address identification information which have been read.

As described above, according to the image generating apparatus and method of the present invention, a composite image is generated in which an image of an object to be printed onto a medium is combined with an image for coordinate address information for locating a position on the medium and an image for address identification information for identifying the coordinate address information. The use of combination of coordinate address information and address identification information identifying coordinate addresses enables effective expansion of the address space that can be represented; for example, this combination can expand the address space in which the addresses of coordinates can be represented without affecting the address detection performance.

Also, according to the image generating apparatus and method of the present invention, from a medium having a composite image printed thereon in which an image of an object to be printed onto the medium is combined with an image for coordinate address information for locating a point on the medium and an image for address identification information for identifying the coordinate address information, the image for coordinate address information and the image for address identification information are read. Based on the image for coordinate address information and the image for address identification information which have been read, positions on which the reading is performed are located. By using combination of the address identification information and the coordinate address information, positions on which the specialized pen or the like are moved on the medium and a motion of the pen can be located.

The image processing apparatus (image generating apparatus and image reading apparatus) involved in the present invention may be configured in various ways, not limited to those described above. The present invention can be provided, for example, as a method or scheme for carrying out the processing steps involved in the present invention, a program implementing such method or scheme, and a storage medium (recording medium) storing the program, and moreover, can be provided as diverse devices and systems.

The scope of application of the present invention is not limited to that implied by the foregoing description and the present invention can be applied to various fields and segments.

The image processing apparatus (image generating apparatus and image reading apparatus) involved in the present invention may be configured such that the processing steps are performed by hardware resources including, for example, a processor, memories, and the like, under the control of a control program stored in a Read Only Memory (ROM) and executed by the processor. For example, each function or unit that performs the appropriate processing step may be configured as an independent hardware circuit.

The present invention can be construed as being embodied in a storage medium readable by a computer, in which the above control program has been stored, such as a floppy (a registered trademark) disk, a compact disc (CD)-ROM, etc. or embodied in the program (itself). By loading the control program from the storage medium into the computer and executing the program, the processing steps involved in the present invention can be carried out.

The entire disclosure of Japanese Patent Application No. 2005-070916 filed on Mar. 14, 2005 including specification, claims, drawings and abstract is incorporated herein by reference in its entirety.

What is claimed is:

1. An image generating apparatus comprising:
  a composite image generating unit that generates a parent image having a plurality of composite sub-images, each of the sub-images being a combination of an image of an object to be printed onto a medium, an image containing coordinate address information for locating a position on the medium within the sub-image, and an image for address identification information; and
  a misalignment detection unit that detects a misalignment distance when a captured two-dimensional code image is out of a framed area within the parent image, and adjusts the coordinate information based on the detected misalignment,
  wherein the address identification information is printed as a group, in a first area, and the coordinate information is printed as another group, in a second area,
  the address identification information in the first area identifies the location of the coordinate information in the second area,
  the first and second areas are located in different locations on the medium, and
  the coordinate address information is based on a pattern used to create the sub-image.

2. The image generating apparatus according to claim 1, further comprising:
  a print object image generating unit that generates the image of an object to be printed;
  a coordinate address information image generating unit that generates the image containing coordinate address information; and
  an address identification information image generating unit that generates the image for address identification information,
  wherein the composite image generating unit generates a composite image in which the generated image of an object to be printed is combined with the image containing coordinate address information and the image for address identification information.

3. The image generating apparatus according to claim 1, wherein:
  the composite image generating unit generates a composite image in which only the image containing coordinate address information and the image of the object are printed in the first area and only the image for address identification information is printed in the second area.

4. The image generating apparatus according to claim 3, wherein:
  the first area is a margin of the medium and the second area is another area of the medium.

5. The image generating apparatus according to claim 1, wherein the medium comprises a plurality of sheets of paper; and
the composite image generating unit generates a composite image in which the image for address identification information is printed onto one of the plurality of sheets.

6. The image generating apparatus according to claim 1, wherein:
the composite image generating unit generates a composite image in which the image containing coordinate address information is printed as an invisible image.

7. The image generating apparatus according to claim 1, wherein:
the composite image generating unit generates a composite image in which the image for address identification information is printed as an invisible image and a visible image to indicate a position of the printing of the address identification information is printed.

8. The image generating apparatus according to claim 1, wherein:
the composite image generating unit generates a composite image in which the image for address identification information is printed as an visible image.

9. The image generating apparatus according to claim 1, wherein:
the address identification information includes attribute information of a device that issues an instruction to print onto the medium.

10. The image generating apparatus according to claim 1, wherein:
the address identification information includes attribute information of a device that prints onto the medium.

11. The image generating apparatus according to claim 1, wherein:
the address identification information includes attribute information of a device that manages the coordinate address information and the address identification information.

12. The image generating apparatus according to claim 1, wherein:
the address identification information includes attribute information of the object to be printed.

13. The image generating apparatus according to claim 1, further comprising:
an information obtaining unit that obtains the coordinate address information and the address identification information from the device that issues an instruction to print onto the medium.

14. The image generating apparatus according to claim 1, further comprising:
a network communication unit that performs communication via a network; and
an information obtaining unit that obtains the coordinate address information and the address identification information from the device that manages the coordinate address information and the address identification information via the network.

15. An image reading apparatus comprising:
an image detecting unit that, from a medium having a parent image having a plurality of composite sub-images, each of the sub-images being a combination of an image of an object to be printed onto the medium, an image containing coordinate address information for locating a position on the medium within the sub-image, and an image for address identification information, reads the image for coordinate address information and the image for address identification information;
a locating unit that locates positions on which the reading is performed, based on the image containing coordinate address information and the image for address identification information read by the image detecting unit; and
a misalignment detection unit that detects a misalignment distance when a captured two-dimensional code image is out of a framed area within the parent image, and adjusts the coordinate information based on the detected misalignment,
wherein the address identification information is printed as a group, in a first area, and the coordinate information is printed as another group, in a second area,
the address identification information in the first area identifies the location of the coordinate information in the second area,
the first and second areas are located in different locations on the medium, and
the coordinate address information is based on a pattern used to create the sub-image.

16. The image reading apparatus according to claim 15, further comprising:
an image display that displays the image of the object printed on the medium, combined with an image representing a reading motion based on the positions located by the locating unit, on a screen.

17. An image generating method:
generating a parent image having a plurality of composite sub-images, each of the sub-images being a combination of an image of an object to be printed onto a medium, an image containing coordinate address information for locating a position on the medium within the sub-image, and an image for address identification information;
detecting a misalignment distance when a captured two-dimensional code image is out of a framed area within the parent image, and adjusts the coordinate information based on the detected misalignment,
wherein the address identification information is printed as a group, in a first area, and the coordinate information is printed as another group, in a second area,
the address identification information in the first area identifies the location of the coordinate information in the second area,
the first and second areas are located in different locations on the medium, and
the coordinate address information is based on a pattern used to create the sub-image.

18. A non-transitory storage medium readable by a computer, the storage medium storing a program of instructions executable by the computer to perform a function for generating an image, the function comprising:
generating an image of an object to be printed on a medium;
generating an image containing coordinate address information for locating a position on the medium;
generating an image for address identification information for identifying the coordinate address information; and
generating a parent image having a plurality of composite sub-images, each of the sub-images being a combination of the image of an object to be printed, the image containing coordinate address information, and the image for address identification information; and
detecting a misalignment distance when a captured two-dimensional code image is out of a framed area within the parent image, and adjusts the coordinate information based on the detected misalignment, wherein the image containing coordinate address information is for locating a position on the medium within the sub-image, the address identification information is printed as a group, in a first area, and the coordinate information is printed as another group, in a second area, the address identification information in the first area identifies the location of the coordinate information in the second area, the first and second areas are located in different locations on the medium, and the coordinate address information is based on a pattern used to create the sub-image.

19. An image reading method:

reading an image containing coordinate address information and an image for address identification information from a medium; and locating a position on which the reading is performed, based on the image containing coordinate address information and the image for address identification information, and detecting a misalignment distance when a captured two-dimensional code image is out of a framed area within the parent image, and adjusts the coordinate information based on the detected misalignment, wherein the medium has a parent image having a plurality of composite sub-images, each of the sub-images being a combination of an image of an object to be printed onto the medium, the image containing coordinate address information, and the image for address identification information, wherein the image containing coordinate address information is for locating a position on the medium within the sub-image, the address identification information is printed as a group, in a first area, and the coordinate information is printed as another group, in a second area, the address identification information in the first area identifies the location of the coordinate information in the second area, the first and second areas are located in different locations on the medium, and the coordinate address information is based on a pattern used to create the sub-image.

20. A non-transitory storage medium readable by a computer, the storage medium storing a program of instructions executable by the computer to perform a function for reading an image, the function comprising:

reading an image containing coordinate address information based on the image and an image for address identification information;

locating a position on which the reading is performed, based on the image containing coordinate address information and the image for address identification information which have been read; and detecting a misalignment distance when a captured two-dimensional code image is out of a framed area within the parent image, and adjusts the coordinate information based on the detected misalignment, wherein the medium has a parent image having a plurality of composite sub-images, each of the sub-images being a combination of an image of an object printed onto the medium, the image containing coordinate address information, and the image for address identification information, the image containing coordinate address information is for locating a position on the medium within the sub-image, the address identification information is printed as a group, in a first area, and the coordinate information is printed as another group, in a second area, the address identification information in the first area identifies the location of the coordinate information in the second area, the first and second areas are located in different locations on the medium, and the coordinate address information is based on the image of a pattern used to create the sub-image.

* * * * *